Patented Apr. 12, 1949

2,467,160

UNITED STATES PATENT OFFICE 2,467,160

CURING CATALYSTS FOR AMINOPLASTS

Milton J. Scott, Springfield, Mass., assignor to Monsanto Chemical Company, St. Louis, Mo., a corporation of Delaware No Drawing. Application February 2, 1948, Serial No. 5,901

9 Claims. (Cl. 260—67.6)

This invention relates to catalysts for accelerating the cure of aminoplasts. More particularly, the invention relates to latent curing catalysts for acid-curing aminoplasts.

The acid-curing aminoplasts are used in large quantities as molding powders for making permanently infusible resinous articles, as the binding agent in adhesives for various applications such as abrasives and plywood, as agents for treating textiles to improve their crease resistance, moisture resistance, shrink resistance, etc., and as agents for treating paper and cellulosic fibers.

A major problem in the use of the acid curing aminoplasts has been the control of the curing step. The curing step is accelerated by heat, acids and acid reacting materials. Heat alone does not generally accelerate the curing rate sufficiently until temperatures are reached which may be detrimental to the resin and material treated by the resin.

Acids and acid reacting materials cause rapid curing of the resins at lower temperatures. They even cause the resins to set up or cure at temperatures as low as room temperature. This property is a source of much difficulty since the catalyst cannot be incorporated into the resin except immediately prior to their use and any delay caused by storage or breakdowns in power or machinery will render the resins unfit for further use due to the curing action of the catalysts during the period of delay.

It is an object of this invention to provide curing catalysts for aminoplasts.

A further object is to provide latent curing catalysts for acid-curing aminoplasts.

Still another object is to provide textile treating compositions comprising acid-curing aminoplasts and water-soluble latent curing catalysts.

These and other objects are attained by using as catalysts for acid-curing aminoplasts, the salts of hydroxy amines in which the amino group is attached to a tertiary carbon atom which is adjacent to at least one carbon atom to which a hydroxyl group is attached.

The following examples are given in illustration and are not intended to limit the scope of this invention. Where parts are mentioned, they are parts by weight.

*Example I*

20 parts of a water-soluble methylol melamine were dissolved in 80 parts of water and 0.4 part of the hydrochloric acid salt of 2-amino-2-methyl-1-propanol were added to the solution. There was no advancement of the resin even after standing for several hours at room temperature.

Cotton cloth was passed through the solution and excess solution was removed until the cloth contained about 12% resin by weight. The impregnated cloth was then heated at 300° F. for ten minutes to obtain a complete cure of the resin. The resultant fabric was shrinkproof and moisture resistant even after repeated launderings and had retained its strength characteristics.

*Example II*

100 parts of a liquid urea-formaldehyde reaction production were dissolved in 72 parts of water and then added to 85 parts of alpha cellulose. The materials were mixed at room temperature until the liquid resin was uniformly absorbed by the cellulose. This mixture was then dried until essentially free of water in a ventilated oven at 150° F. This dried composition was ground in a ball mill with 3 parts of the crystalline phosphoric acid salt of 2-amino-2-methyl-1-butanol. The resultant powder was molded into a disc at 150° C. and 4000 p. s. i. for 75 seconds. The molded object had a hard brilliant surface and showed very low water absorption. The molding powder was stable in storage indefinitely.

*Example III*

100 parts of a solid water-soluble urea-melamine formaldehyde resin were mixed dry with 100 parts of walnut shell flour. The mixture was then ground in a ball mill with 5 parts of the crystalline phosphoric acid salt of 2-amino-2-ethyl-1-butanol. The product was a fine powder which could be used as an adhesive either by applying the powder between two surfaces and then heating the lamination under pressure or more advantageously by adding water to the powder to form a paste, applying the paste to the objects to be cemented and then heating the treated articles to cure the resin and drive off the water.

The catalysts of this invention are particularly useful in connection with textile treating agents comprising water-soluble acid-curing aminoplasts. These water-soluble resins are easily and economically applied to textiles and increase their resistance to shrinkage, creasing and moisture without substantially altering the hand of the fabrics or the physical properties thereof. The catalysts may be incorporated in the aqueous resin solution without danger of premature-ly curing the resins in cases of unavoidable delay in using the solution. The catalysts do not hydrolyse or otherwise decompose in water at ordinary temperatures as do other water-soluble acid-reacting catalysts such as diammonium phosphate and zinc chloride.

The catalysts of this invention are the addition products of acids and hydroxy amines in which the amino group is on a tertiary carbon atom adjacent to at least one carbon atom to which a hydroxy group is attached. The invention is not limited to monoamine salts since salts of diamines and polyamines may be used providing there is a hydroxy group on a carbon atom adjacent to each carbon atom carrying an amine group and providing that the carbon atom to which the amino group is attached is tertiary, i. e., is no directly attached to a hydrogen atom. Furthermore, catalysts may have a plurality of hydroxy groups in the molecule only one of which need be in the stated position. The remainder of the catalyst molecule may contain alkyl, aryl, aralkyl, cyclic and heterocyclic groups which groups may be substituted by inorganic groups such as the halogens. The hydroxy amines include such compounds as 2-methyl-2-amino-1-propanol, 2-methyl-2-amino-1,3-propanediol, tris(hydroxy methyl) amino methane, 2-phenyl-2-amino-1-propanol, 2-methyl-2-amino-1-pentanol, etc.

This application is a continuation-in-part of application Serial No. 728,733, filed February 14, 1947.

The acids used to make the catalysts by addition to the hydroxy amine may be inorganic or organic, saturated or unsaturated, monobasic or polybasic. Examples of the acids are hydrochloric, phosphoric, sulfuric, sulfamic, sulfonic, acetic, chloroacetic, propionic, butyric, acrylic, cinnamic, benzoic phthalic, boric acid, and maleic acids.

The amount of catalyst used will vary according to the resin to be cured and also according to the use to which the composition is to be applied. Generally a range of from about 0.1 to about 10.0 parts per 100 parts of resin may be employed.

The aminoplasts which may be cured with the latent catalysts of this invention are the aldehyde reaction products of urea, thiourea, aminotriazines such as melamine, ammeline, etc., guanidines, and derivatives and homologues of the same. Furthermore, the resins may be made from mixtures of two or more of the amino compounds and two or more aldehydes may be employed. The reaction products may be further modified by reaction with alcohols, amides, toluene sulfonamides, etc.

The addition of the catalysts of this invention to acid curing aminoplasts makes possible the production of compositions which are stable at normal temperatures and which may be cured in a relatively short time at temperatures ranging from 200 to 300° F.

It is obvious that many variations may be made in the processes and products of this invention without departing from the spirit and scope thereof as defined in the appended claims.

What is claimed is:

1. A composition comprising an acid curing aminoplast and from 0.1–10.0 parts per 100 parts of aminoplast of a hydroxy amine salt in which a primary amino group is on a tertiary aliphatic carbon atom adjacent to at least one carbon atom to which an alcoholic hydroxy group is attached and the remainder of the molecule consists of hydrocarbon radicals taken from the group consisting of alkyl and aryl.

2. A composition as in claim 1 wherein the hydroxy amine salt is a salt of 2-methyl-2-amino-1-propanol.

3. A composition as in claim 1 wherein the hydroxy amine salt is a salt of 2-amino-2-methyl-1-butanol.

4. A composition as in claim 1 wherein the hydroxy amine salt is a salt of 2-amino-2-ethyl-1-butanol.

5. A composition as in claim 1 wherein the aminoplast is a urea-aldehyde condensation product.

6. A composition as in claim 1 wherein the aminoplast is an aminotriazine-aldehyde condensation product.

7. A composition as in claim 1 wherein the aminoplast is a melamine-aldehyde condensation product.

8. A composition as in claim 1 wherein the hydroxy amine salt is the hydrochloric acid salt of 2-methyl-2-amino-1-propanol.

9. A composition as in claim 1 wherein the hydroxy amine salt is the phosphoric acid salt of 2-methyl-2-amino-1-propanol.

MILTON J. SCOTT.

REFERENCES CITED

The following references are of record in the file of this patent:

UNITED STATES PATENTS

| Number | Name | Date |
|---|---|---|
| 2,088,227 | Battye et al. | July 27, 1937 |
| 2,317,181 | D'Alelio | Apr. 20, 1943 |